(12) United States Patent
Chapin et al.

(10) Patent No.: US 7,614,211 B2
(45) Date of Patent: Nov. 10, 2009

(54) SWIRLING FLOWS AND SWIRLER TO ENHANCE PULSE DETONATION ENGINE OPERATION

(75) Inventors: David Michael Chapin, Niskayuna, NY (US); Anthony John Dean, Scotia, NY (US); Christian Lee Vandervort, Voorheesville, NY (US); Venkat Eswarlu Tangirala, Niskayuna, NY (US); Edward Randall Furlong, Beverly, MA (US)

(73) Assignee: General Electric Company, Niskayuna, NY (US)

( * ) Notice: Subject to any disclaimer, the term of this patent is extended or adjusted under 35 U.S.C. 154(b) by 510 days.

(21) Appl. No.: 11/304,411

(22) Filed: Dec. 15, 2005

(65) Prior Publication Data

US 2007/0137171 A1    Jun. 21, 2007

(51) Int. Cl.
*F02K 5/02* (2006.01)
(52) U.S. Cl. .................. 60/247; 60/39.38; 60/39.76
(58) Field of Classification Search .................. 60/247, 60/39.38, 39.76
See application file for complete search history.

(56) References Cited

U.S. PATENT DOCUMENTS

| | | | | |
|---|---|---|---|---|
| 3,713,588 A | * | 1/1973 | Sharpe | ........................ 239/400 |
| 5,165,241 A | | 11/1992 | Joshi et al. | |
| 5,351,477 A | * | 10/1994 | Joshi et al. | ................ 60/39.463 |
| 5,513,489 A | * | 5/1996 | Bussing | ...................... 60/39.38 |
| 2002/0050139 A1 | * | 5/2002 | Le Gal et al. | ................... 60/742 |
| 2005/0067506 A1 | * | 3/2005 | Stotts et al. | .................. 239/461 |

* cited by examiner

*Primary Examiner*—Michael Cuff
*Assistant Examiner*—Phutthiwat Wongwian
(74) *Attorney, Agent, or Firm*—Francis T. Coppa

(57) ABSTRACT

A swirler having cross-sectional area comparable to the area of a detonation chamber is placed upstream of the detonation chamber to enhance the fuel-air mixing. The swirler has a first region and a second region, each of which induces swirl in the flow through the swirler. Each region induces a different direction of swirl in the flow. The residual net swirl present in the flow downstream of the swirler is controlled by the relative properties of each region of the swirler. The swirler also provides high optical blockage to inhibit the upstream propagation of flow due to the detonation shockwave.

12 Claims, 3 Drawing Sheets

SWIRLING FLOWS AND SWIRLER TO ENHANCE PULSE DETONATION ENGINE OPERATION

BACKGROUND OF THE INVENTION

This invention relates to pulse detonation engines, and more particularly, to a swirler used in conjunction with the pulse detonation engine to enhance the pulse detonation engine operation.

In recent years, efforts to address the need of a combination of combustion systems to obtain a wide range of flight speeds for aircraft have led to the development of pulse detonation combustors, which can be used for propulsion applications including aircraft engines (as well as several other applications). When used on aircraft engines, pulse detonation engines aid in increasing the available flight speed range of an aircraft engine while reducing the fuel consumption.

Pulse detonation combustors operate using detonation or deflagration waves, created by combusting a mixture of gas (typically air) and a fuel in a confined volume. The detonation/deflagration waves exit the pulse detonation combustor tube as pulses, thus providing thrust. A main challenge with current pulse detonation combustors relates to achieving a relatively high frequency of operation (i.e. pulses) along with high mass flow throughput and low pressure drop. This can be achieved by minimizing the time needed for each process in the pulse detonation cycle.

Key processes that influence the cycle time include the mixing of the continuous air throughput with the injected fuel prior to detonation, and the uniformity of the stoichiometric mixture throughout the tube. Proper fuel-air mixture is important for successful and efficient operation of a pulse detonation engine. Thus efforts have been made to optimize the fuel-air mixing process, including using opposing jets of fuel and air, turbulence enhancing screens and straight flow fuel injector manifolds. However, there is still a need to improve the mixing of the fuel-air mixture.

SUMMARY OF THE INVENTION

In one embodiment of the system described herein, a detonation device is constructed having a detonation chamber and swirler. The detonation chamber has an upstream end for receiving a flow and a downstream end for discharging the flow. The swirler is in fluid communication with the upstream end of the detonation chamber and has a cross-sectional area substantially the same as the cross-sectional area of the upstream end of the detonation chamber. The swirler is divided into at least a first region and a second region, such that the flow that passes through the first region of the swirler acquires a swirl in a first rotational direction and the flow that passes through the second region of the swirler acquires a swirl in a second rotational direction. The first rotational direction and the second rotational direction are opposite directions of rotation about the axis of the swirler.

BRIEF DESCRIPTION OF THE DRAWINGS

The above mentioned and other features will now be described with reference to the drawings of an embodiment of the flow swirling device. The drawings are intended to illustrate, but not to limit the invention. The drawings contain the following figures.

DETAILED DESCRIPTION OF THE INVENTION

Figure 1:
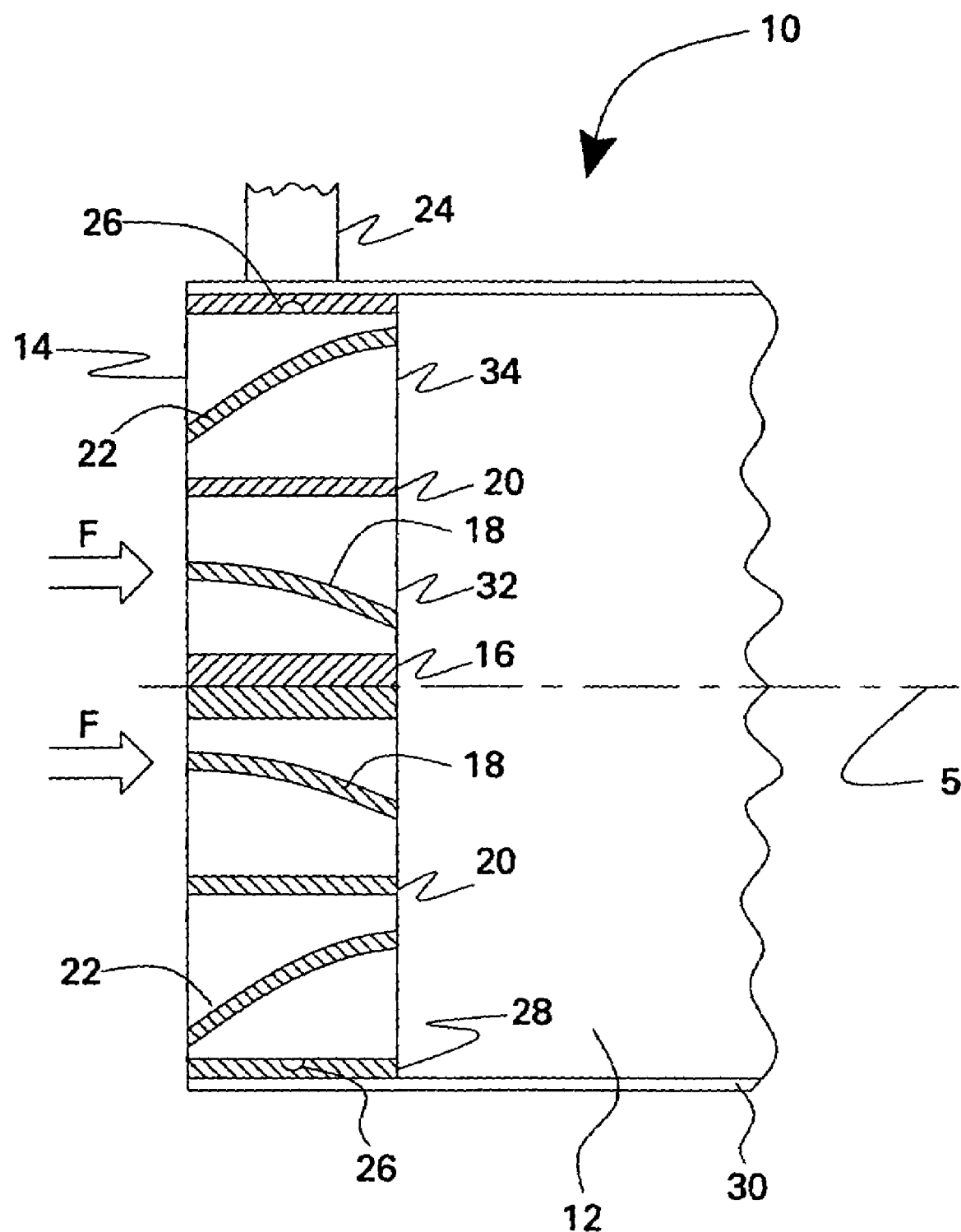
FIG. 1 is a partial cross-sectional side view of a detonation tube with a swirler in accordance with one embodiment described herein.

Various flow swirling devices and techniques for use in enhancing detonations will be described below in further detail by making reference to the accompanying drawings, which are intended to illustrate these techniques and devices. In the descriptions that follow, the term "axial" refers broadly to a direction parallel to a generally central axis along which the system is disposed. This axis 5 runs from the front of the system to the back of the system. As shown in FIG. 1, the axial direction extends from the left of the Figure, through the swirler 14, and along the center of the exemplary detonation tube 10. The term "radial" refers broadly to a direction that is perpendicular to the central axis and that points towards or away from that axis. A "circumferential" direction at a given point is a direction that is normal to the local radial direction and normal to the axial direction as well.

The described systems are configured such that a flow of fluid will pass through them (the flow is identified generally as "F" in FIG. 1). As used herein, the "upstream" direction refers to the direction from which the local flow is coming, while a "downstream" direction refers to the direction in which the local flow is traveling. In the most general sense, flow through the system tends to be from front to back, so the "upstream direction" will generally refer to a forward axial direction (to the left in FIG. 1), while a "downstream direction" will refer to a rearward axial direction.

FIG. 1 shows an exemplary detonation tube 10 having a swirler 14 positioned upstream from the detonation chamber 12. The tube 10 extends downstream further and has a downstream exit (not shown) allowing the flow through the tube to exhaust from this system. The exit may be an exhaust from an engine, venting directly to the ambient environment, or may expel the flow into another engine component, depending upon the application of the particular detonation tube. For example, in an engine where detonation combustors are used in place of traditional combustors, the flow from the detonation tube may be directed into a plenum, or into a turbine for further work extraction, prior to being expelled from the engine.

As shown in the illustrated embodiment, the swirler 14 is positioned centrally with respect to a centerline or axis 5 of the detonation tube 10 such that a centerline of the hub 16 is lies on the central axis 5 of the tube 10.

In general operation, a flow of air enters the tube 10 from an upstream source, flows through the swirler 14 and into the detonation chamber 12. Fuel is added to the flow of air, and an ignition source (not shown) is used to initiate a detonation of the fuel/air mixture. The detonation produces a shockwave front that travels through the tube, consuming the fuel and blowing the combustion products out the downstream end of the tube 10. The fuel can be either a gaseous fuel, a spray of liquid fuel, or a combination of the two.

Production of a detonation, as opposed to ordinary deflagrative combustion, of the fuel/air mixture in the tube is dependent upon a number of factors. One factor that can influence the production of a detonation is the uniformity of the fuel/air stoichiometry in the mixture to be detonated. Enhancing the mixing of the fuel and air can more rapidly create a mixture suitable for detonation. A swirler, such as that described herein, can be used to create turbulence in the flow through the tube that will enhance the mixing of the fuel and air. While the amount of swirl that is desirable for the proper amount of mixing will vary with the properties of the fuel, creating a large amount of overall swirl within the flow through tube may not be desirable.

For example, turbulence on a small scale can be used to address the dispersion of the fuel within the airflow within the tube. This turbulence can be used to produce a more uniform distribution of fuel particles within the flow. However, large-scale flow artifacts such as overall swirl within the tube can lead to non-uniformities of fuel distribution.

In particular, when working with liquid fuel suspended as a spray of droplets within the airflow, it is desirable for there to be very little residual swirl in the detonation chamber 12. This is because residual swirl can lead to radial pressure gradients within the flow in the chamber, which can alter the distribution of the fuel droplets. Therefore, there is a desire to introduce swirl, at least locally, in the flow entering the detonation chamber 12 in order to promote the mixing of the fuel and air within the chamber, but not to create a large amount of residual swirl that could support non-uniformities in the fuel/air mixture in the chamber.

The term "net swirl" will be used to refer to the ratio of circumferential momentum in the flow to the axial momentum in the flow in the tube at a particular axial location. If all the flow across a cross-section at a particular axial point in the tube were to be in a purely axial direction, this would represent a net swirl of 0, since the circumferential flow velocity would be zero. When the circumferential component of the flow is comparable to the axial component, the net swirl is 1.0.

As noted above, it is desirable not to have a large amount of net swirl present in the flow downstream from the swirler in order to avoid the creation and support of large scale vortical structures that can lead create and support non-uniformities in the fuel/air mixture. These non-uniformities interfere with the formation and propagation of a detonation in the tube. Therefore, when the swirler is being used with a detonation chamber, it is desirable to limit the amount of net swirl that remains in the flow downstream of the swirler.

In particular, it has been found that when operating with gaseous fuels in an air mixture, it is desirable to have a net swirl that is less than about 1.0. When operating with liquid fuel, a lower residual net swirl is preferable, less than about 0.2, although successful detonation can be achieved with gaseous fuels even at net swirl ratios up to about 0.6.

While swirlers have generally been used in the prior art to enhance mixing in fuel flows for combustion, most have been designed with specific features that are detrimental when operating a detonation combustor. For example, the flow from the swirler is often passed through a converging duct downstream of the swirler and then expanded into the combustion chamber itself. The use of a converging duct assists in preventing backflow from the combustion region, located further downstream, into the mixing region. The converging duct also accelerates the flow which can be useful in controlling the boundary layers in the duct that can disrupt the combustion. Similarly, the prior art generally uses a combustion chamber of a larger cross-section than the mixing duct, thereby requiring an expansion region between the mixing region and the combustion chamber. For ordinary combustion, this can provide specific advantages, such as creating intentional areas of recirculation (large-scale vorticity) to enhance flameholding. However, these advantages can be disadvantages when designing a mixing system for a detonation combustion system.

Figure 2:
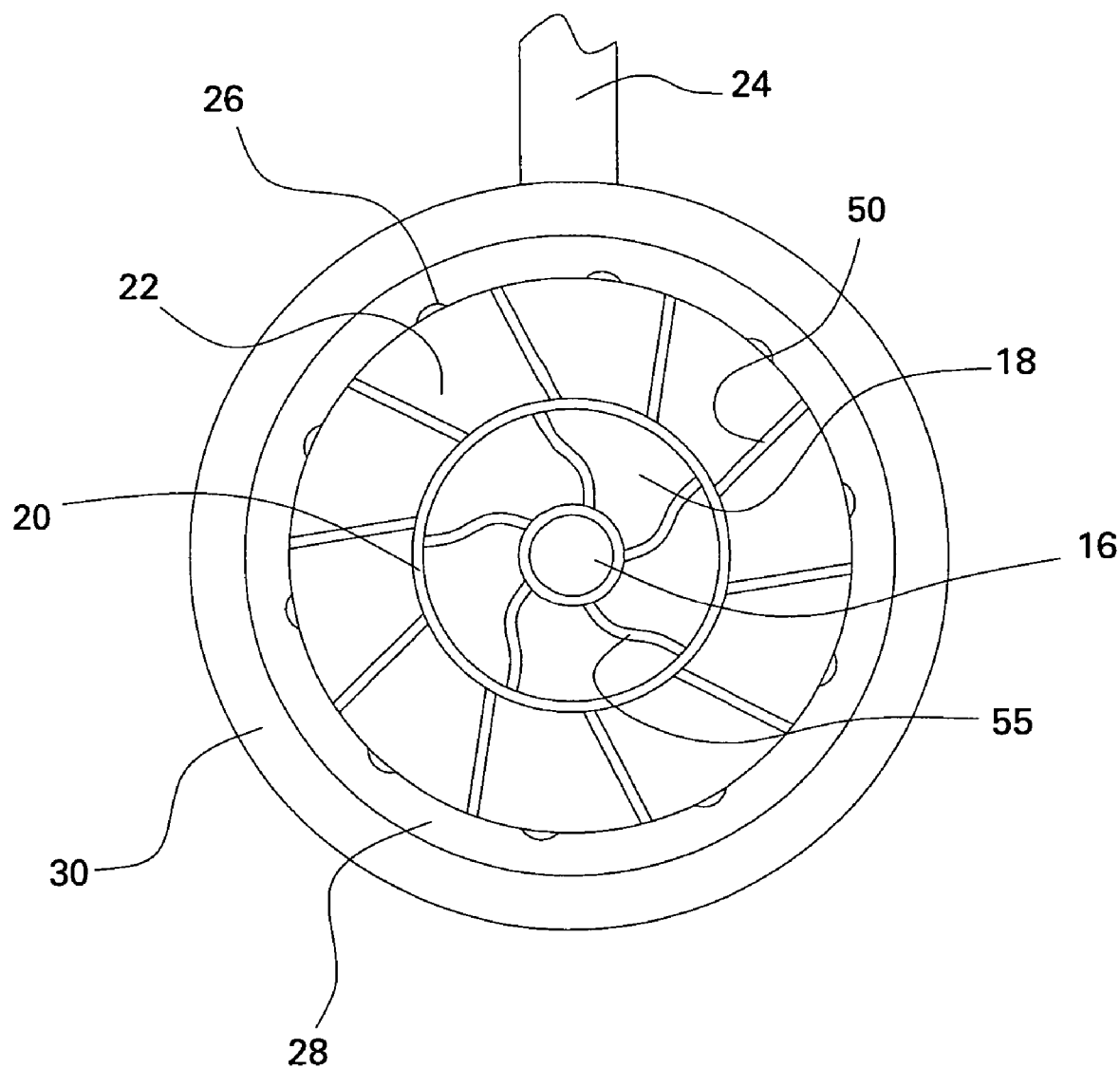
FIG. 2 is a downstream view of the swirler and detonation tube of FIG. 1.

One example of such a mixing system can be seen in U.S. Pat. No. 5,165,241 to Joshi et al. As can be seen in FIG. 2 of this patent, after passing through a mixer 24 having an inner swirler 26 and an outer swirler 28, the flow moves through a converging mixing duct 37, before being discharged into a general combustion region 62 that has a larger cross-sectional area.

Because features such as a converging mixing duct and an expansion into the combustion chamber, as found in the prior art swirlers designed for deflagrative combustion, are disadvantages for detonative combustors, it is desirable in the present systems and methods described herein for the mixing to take place in a tube that does not have a converging-diverging cross-section.

As can be seen in FIG. 1 of the present application, the detonation chamber 12 is formed from a tube 10 of substantially constant cross-section, and the swirler 14 is disposed within this tube. As a result, the flow F that enters into the tube 10 is neither compressed nor expanded by the shape of the tube 10 as it passes through.

An exemplary swirler in accordance with the systems and techniques of this disclosure is shown in FIG. 1. The swirler 14 is made up of two regions. As can been seen one region comprises an inner portion 32 and the other an outer portion 34. Positioned radially adjacent to and outward from the hub 16 is the inner portion 32, having a plurality of inner vanes 18. Positioned radially adjacent and outward from the inner portion 32 is the outer portion 34. The outer portion 34 contains a plurality of outer vanes 22, and the inner portion 32 and the outer portion 34 are divided from each other by an inner wall 20. Radially outward from the outer portion 34 is an outer wall 28, which is also adjacent to a wall 30 of the tube 10.

During operation, a continuous flow F of air is directed at the swirler 14 such that the air passes through each of the outer and inner portions and enters the detonation chamber 12 of the tube 10. Both the inner 18 and outer 22 vanes impart a swirling flow to the air so that the flow of air into the chamber 12 is turbulent. In the depicted embodiment, one portion of the flow F of air passes through the inner portion 32 of the swirler, and another portion of the flow F of air passes through the outer portion 34 of the swirler 14.

The inner portion 32 and the outer portion 34 of the swirler 14 are configured so that they induce swirl in opposite directions. For instance, the portion of flow F that passes through the inner portion 32 of the swirler 14 may have a positive swirl induced in it (tending to rotate counter-clockwise when viewed looking downstream along the central axis), while the portion of the flow F that passes through the outer portion 34 of the swirler 14 may have a negative swirl induced in it (clockwise when viewed looking downstream along the central axis).

In the embodiment in FIG. 1, the fuel is injected into the flow F of air through fuel ports 26 which are positioned radially on the outer wall 28 of the swirler 14. During operation, fuel enters the assembly through a fuel inlet 24 and is distributed via a manifold structure, or the like, to each of the fuel ports 26. The fuel passes through the fuel ports 26 into the flow F of air passing through the swirler 14. Because of the turbulence imparted to the flow F of air, the mixing of the fuel and air is enhanced. As noted above, the fuel may be a gas, a liquid or in mixture of gaseous and liquid states.

In another embodiment of the present system, at least some of the fuel is injected into the flow F of air upstream of the swirler 14, such that a mixture of fuel and air enters the upstream side of the swirler 14. Additionally, in yet another embodiment of the present system the fuel ports 26 are located radially along the inner wall 20, the hub 16, the inner vanes 18 and/or the outer vanes 22. The presented systems and techniques contemplate various combinations of fuel port 26 placement so that mixing of the fuel with the flow F of air is maximized. However, there is no particular location of fuel port that is required in order to use the swirlers and flow mixing techniques described.

In another particular embodiment, fuel ports may be extended through the inside of the outer vanes and through the inner wall 20. This provides an ability to inject fuel into both the flow through the inner region and the outer region. By injecting fuel into the flow through both regions, a more effective distribution of fuel into the flow may be made, further enhancing the overall mixing process.

As noted above, the flow through different regions of the swirler 14 may have swirl of different directions induced in it. As a result, the overall net swirl present in the flow downstream of the swirler may be controlled by controlling the amount of the flow that passes through the separate portions of the swirler, as well as by controlling the amount of swirl that each portion of the swirler is designed to impart to the flow passing through it. In this manner, appropriate design choices may be made to provide swirling sufficient to enhance mixing in the flow, while still providing a net swirl downstream of the swirler that is low enough to not interfere with the creation and propagation of detonations in the detonation chamber 12.

As noted above, the swirler illustrated in FIGS. 1 and 2 has two portions: an inner portion 32 and an outer portion 34. Each has an annular shape that is concentric with the tube 10 in which the swirler 14 is disposed. In designing the swirler, the amount of flow F that passes through the respective portions of the swirler can be controlled by altering the cross-sectional area for each of the two regions. As used herein, the cross-sectional area refers to the cross section taken normal to the central axis 5 of the tube 10. Because the flow entering the tube 10, and therefore the swirler 14, is flowing substantially parallel to the axis of the tube, the amount of flow through each portion of the swirler will be roughly proportional to the area of each portion of the swirler. By choosing an appropriate ratio between the cross-sectional area of the portions of the swirler, and configuring the portions to produce swirl in opposite directions, as noted above, it is possible to adjust the design of the swirler to minimize the amount of residual net swirl for particular operating conditions.

Turning now to FIG. 2, the following is a more detailed description of the swirler 14. As shown in FIG. 2 the inner vanes 18 are angled in different direction than the outer vanes 22, such that the swirler is configured to produce different swirl from the inner and outer portions. Stated differently, the outer vanes 22 impart a different rotational angle and/or direction than the inner vanes 18. Such a configuration enhances mixing of the flow F. The swirler 14 may be manufactured such that the roots of the inner vanes 18 are secured to the hub 16 and the tips of the inner vanes are secured to the inner wall 20, whereas the roots of the outer vanes 22 are secured to the inner wall 20 and the tips are secured to the outer wall 28.

As can be seen in FIG. 2, there are various configurations possible for the vanes of the swirler. For example, the illustrated outer vanes 22 are two-dimensional, not having a complex curvature along their leading edge, whereas the inner vanes 18 are shown as three-dimensional, having such a complex curvature along their leading edge. Such curvature, or camber, is also possible along the chord of the vanes, as can be seen in the side view shown in FIG. 1. The techniques and systems described herein are not limited to any particular one of these configurations. Various alternative embodiments can use inner and outer vanes of configurations similar to one another, or of opposite configuration. Such choices can be made to optimize the overall operational and performance parameters.

Such changes in the shape of the vanes, as well as in the pitch with which the vanes are mounted relative to the oncoming axial flow, can also be used to adjust the amount of swirl that is imparted to the flow through each portion of the swirler 14.

Figure 3:
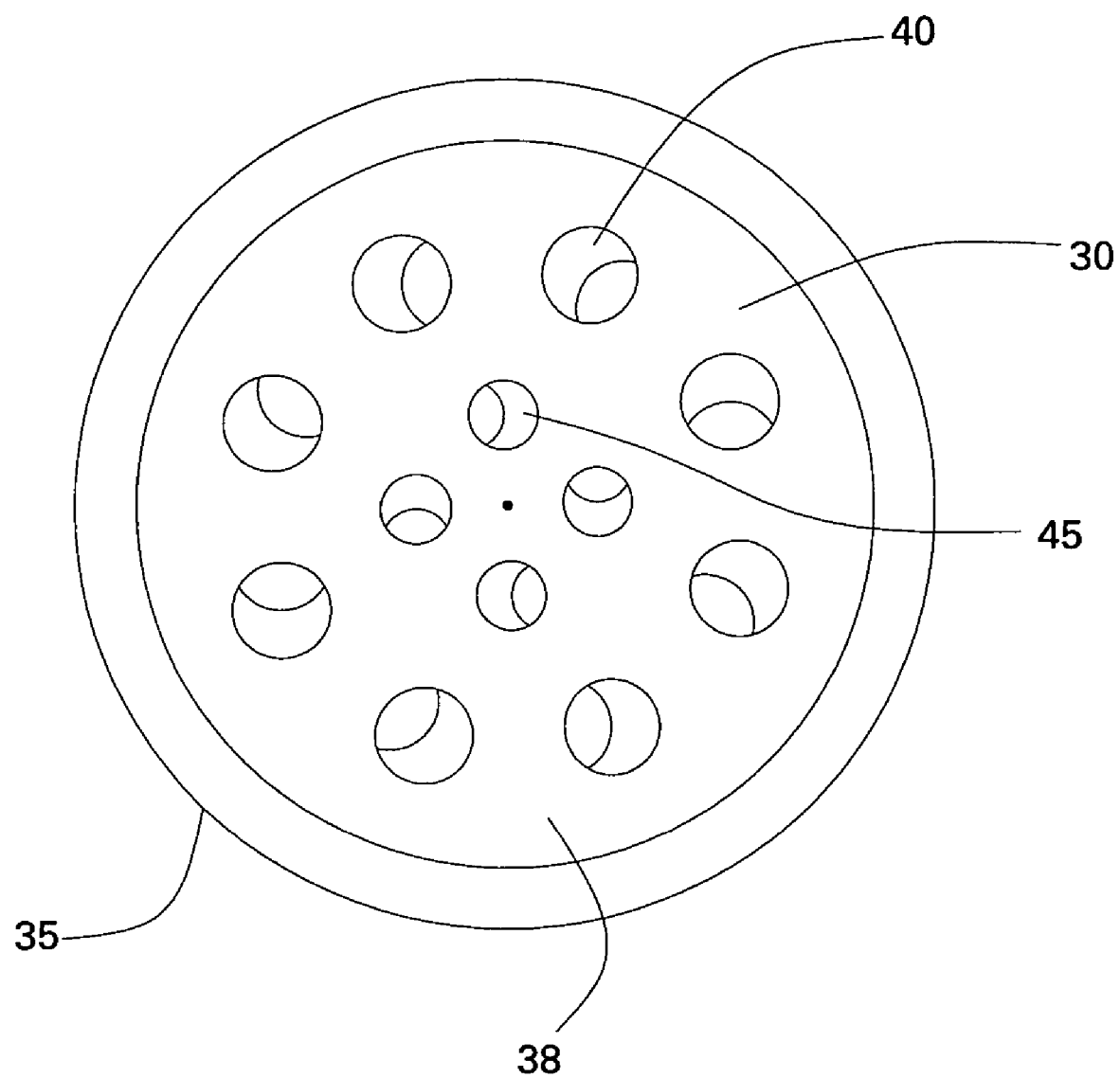
FIG. 3 is a downstream view of a swirler in accordance with another embodiment described herein.

An embodiment of a different exemplary swirler is illustrated in FIG. 3. The swirler 30 is essentially a plate 38 disposed within the tube 35. The plate has a number of apertures 40, 45 that pass through it, connecting the upstream side and the downstream side. The flow passes through these apertures. The apertures may be formed, for example, by drilling holes through the plate 38. By disposing these apertures such that the axis of each hole 40, 45 drilled through plate 38 is not parallel to the central axis of the tube 35, the path that the flow must take when passing through each hole is altered from the substantially axial flow that is incident upon the plate 38, to acquire tangential and/or radial components.

By angling the axis of each hole in a tangential direction, the flow can be made to take on a tangential swirl as it exits the apertures 40, 45 of the plate 38. As can be seen in FIG. 3, the tangential direction in which the holes are angled can be varied for different regions of the swirler 30. For example, in the outer region of the illustrated swirler 30, the apertures 40 can be seen to induce a clockwise tangential component to the direction of the flow through the holes. Conversely, the apertures 45 disposed in the inner region of the swirler are angled such that a counter-clockwise tangential velocity will be acquired by the flow.

As was noted above with respect to the radial vanes of the swirler 14 of FIGS. 1 and 2, it is possible to adjust the amount of swirl imparted by the various regions of the swirler 30 by altering the angle relative to the axial direction of each hole 40, 45.

The amount of flow that passes through each portion of the swirler 30 can be adjusted by changing the relative area of the apertures to the overall area of the plate in a given region (effectively changing the porosity of the portion of the plate), as well as by changing the cross sectional size of the portion of the plate that is configured to produce swirl in each direction. It will also be understood that the apertures 40, 45 need not have a circular cross-section, nor need they have a constant cross-section along the length of the hole. The holes may also be angled in the radial direction as desired.

A circular disposition of holes is illustrated in FIG. 3 for both the inner and outer regions of the swirler 30. However, it will be understood that a variety of different patterns of holes, as well as sizes, angles, and depths to the plate may be used to control the amount of swirl that is imparted to the flow through the swirler 30.

In addition to radial vanes as shown in FIGS. 1 and 2, or aperture plates as shown in FIG. 3, tangential vanes can also be used in a further embodiment of the systems described herein. As will be understood by those of skill in the art, these and any other variations can be used without deviating from the applicability of the systems and techniques taught in order to provide a mixing swirler for a detonation chamber.

As discussed above, the amount of swirl imparted to the flow passing through a particular portion of the swirler may be controlled by varying properties of the swirl inducing elements, whether they are radial vanes, tangential vanes, apertures, or a combination of these features. Furthermore, by adjusting the relative size of the regions, the amount of net swirl produced may also be controlled. By appropriate selection of the degree of swirl induced by a given portion of the swirler, the fraction of the swirler that is in a given portion, and the selection of the type of swirl inducing device, a designer may induce the desired swirl to enhance mixing for particular design criteria, while eliminating much of the residual swirl that can interfere with the operation of detonation combustors.

Another feature of detonation combustors that differs from traditional deflagrative combustors is that a shockwave is produced in a detonation. This shockwave can propagate both upstream and downstream along the detonation chamber. It is often desirable to prevent the propagation of such a shockwave into the portions of the engine located upstream of the combustion chamber, so that the spike in back-pressure associated with the shockwave does not damage components, such as compressor blades, and does not interfere with the flow into the combustor.

Because the swirler is disposed between the detonation chamber and the upstream components, the swirler can provide a degree of shock reflectivity and thereby inhibit the upstream propagation of any shockwaves out of the detonation chamber. The amount of the shockwave that is able to propagate upstream through the swirler can be controlled by altering the amount of clear flow path that is present along the axial direction through the swirler. Because the shockwave generally travels upstream in a substantially axial direction, pure axial blockage is effective in inhibiting upstream shock propagation. The degree to which the swirler provides an obstruction to the purely axial propagation is referred to as the "optical blockage" of the swirler, because it represents the degree to which the swirler cannot be seen through in a purely axial direction.

The amount of optical blockage provided by a swirler can be adjusted by changing the number and angle of vanes (when used with an embodiment as illustrated in FIG. 1) or by the number and angle of holes (when used with an embodiment as illustrated in FIG. 3).

Additionally, the swirler can be structured and configured to provide a flow diode effect regarding flow through it. Specifically, the swirler structure can be configured to allow maximum flow of the fuel-air mixture downstream through the swirler into the detonation chamber 12, while at the same time reducing the amount of backflow associated with the shockwave from the detonation chamber 12 to the upstream side of the swirler 14 during detonation.

For example, in FIG. 2, an embodiment is shown in which both the inner 18 and outer 22 vanes are structured such that there is high optical blockage. As can be seen, each of the inner 18 and outer vanes 22 in the inner 32 and outer 34 portions nearly overlap in the circumferential direction with the circumferentially adjacent vanes, when viewed in an axial direction. As a result, there are very few areas in which there is a direct line of sight from an upstream side to a downstream side of the swirler 14 when viewed along the axis the tube. Such unobstructed regions 50, 55 are indicated between the outer vanes 22 and inner vanes 18, respectively in FIG. 2. It can be seen that these unobstructed regions represent a small fraction of the overall cross-sectional area of the swirler 14.

Lesser or greater degrees of optical blockage could be achieved by using vanes that provided more or less circumferential overlap, or by spacing the vanes closer together about the axis of the swirler. Compete optical blockage is also possible.

Similar techniques can be used with a swirler 30 such as that illustrated in FIG. 3 by altering the angle of the holes 40, 45, the axial thickness of the aperture plate 38, and the overall porosity of the aperture plate.

By altering the dimensions, geometry and configuration of the portions of the swirler, the swirler can be configured to act as a flow diode. Stated differently, the swirler can be configured using these techniques such that there is a low pressure drop in the downstream direction (allowing easy flow of air or the fuel-air mixture) while having a higher pressure drop in the upstream or backflow direction. Having a high pressure drop in the backflow direction helps inhibit the pressure wave from the detonation/deflagration from traveling upstream through the swirler 14.

Although the swirler need not have identical cross-sectional shape or size as the tube, it is generally desirable that there is not a substantial difference in overall cross-sectional area between the swirler and the tube in order to prevent the pressure gradients that are created converging and diverging regions, as seen in the prior art.

In one embodiment, the swirler 14 is rotationally fixed within the tube 10. This embodiment reduces the complexity of the manufacture and operation of the tube. However, in an additional embodiment the swirler 14 is free to rotate or is rotational driven, or has the rotation induced by the flow through the swirler 14 to provide additional turbulence to the airflow. In yet a further embodiment, the swirler 14 is manufactured such that both the inner portion 32 and the outer portion 34 rotate independent of each other at either different rotational speeds and/or in different opposite rotational directions. Although such a configuration adds to the complexity of manufacture and operation, such a configuration can be used to optimize mixture of the fuel-air mixture and to prevent back flow through the swirler 14 during detonation or deflagration in the chamber 12.

The various embodiments of swirlers described above thus provide a way to enhancing the mixing of fuel and air entering a detonation chamber. These techniques and systems also help to inhibit the upstream propagation of shockwaves produced during the detonation of the fuel air mixture.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the rotating vanes described with respect to one embodiment can be adapted for use with embodiments using tangential vanes instead of radial vanes. Similarly, the various features described, as well as other known equivalents for each feature, can be mixed and matched by one of ordinary skill in this art to construct swirlers in accordance with the principles of this disclosure.

Although the systems herein have been disclosed in the context of certain embodiments and examples, it will be understood by those skilled in the art that the invention extends beyond the specifically disclosed embodiments to other alternative embodiments and/or uses of the systems and techniques herein and obvious modifications and equivalents thereof. Thus, it is intended that the scope of the invention disclosed should not be limited by the particular disclosed embodiments described above, but should be determined only by a fair reading of the claims that follow.

What is claimed is:

1. A detonation combustion device, comprising:
a detonation chamber having an upstream end for receiving a flow and a downstream end for discharging the flow; and
a swirler in fluid communication with the upstream end of the detonation chamber and having a cross-sectional area substantially the same as the cross-sectional area of the upstream end of the detonation chamber, the swirler being divided into at least a first region having a plurality of vanes angled in a first direction with respect to an axis of the swirler and a second region having a plurality of vanes angled in a second direction with respect to the axis of the swirler such that the flow that passes through the first region of the swirler is directed in a first rotational direction and the flow that passes through the second region of the swirler is directed in a second rotational direction,
wherein the first rotational direction and the second rotational direction are different directions of rotation with respect to the axis of the swirler, and
wherein the plurality of vanes of the first and second regions are angled such that adjacent vanes nearly overlap each other in a circumferential direction, thereby increasing an optical blockage of the flow passing through the first and second regions of the swirler.

2. A device as in claim 1 wherein the detonation chamber is a tube.

3. A device as in claim 1 wherein the swirler has a circular cross section shape and is disposed concentrically with the detonation chamber.

4. A device as in claim 3 wherein each of the first region and the second region of the swirler have an annular cross-sectional shape.

5. A device as in claim 1 wherein the net swirl produced by the swirler is controlled by the relative size of the first region and the second region of the swirler.

6. A device as in claim 1 wherein the net swirl produced by the swirler is controlled by a pitch of the vanes of the first region of the swirler relative to a pitch of the vanes of the second region of the swirler.

7. A device as in claim 1 wherein the net swirl produced by the swirler is controlled by the relative open area of the first region and the second region of the swirler.

8. A device as in claim 1 wherein the net swirl produced by the swirler is less than 1.0.

9. A device as in claim 1 wherein the net swirl produced by the swirler is less than 0.6.

10. A device as in claim 1 wherein the net swirl produced by the swirler is less than 0.2.

11. A device as in claim 1 wherein one end of the vanes of the first region are secured to a hub of the swirler and the other end of the vanes of the first region are secured to an inner wall, and wherein one end of the vanes of the second region are secured to the inner wall and the other end of the vanes of the second region are secured to an outer wall.

12. A device as in claim 1 wherein the vanes of the first region have a non-linear leading edge, and wherein the vanes of the second region have a substantial linear leading edge.

* * * * *